United States Patent
Maes

(10) Patent No.: US 8,051,472 B2
(45) Date of Patent: Nov. 1, 2011

(54) METHOD AND APPARATUS FOR PERSONALIZATION AND IDENTITY MANAGEMENT

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1267 days.

(21) Appl. No.: 10/890,786

(22) Filed: Jul. 13, 2004

(65) Prior Publication Data

US 2005/0137981 A1    Jun. 23, 2005

Related U.S. Application Data

(60) Provisional application No. 60/530,599, filed on Dec. 17, 2003.

(51) Int. Cl.
| | |
|---|---|
| G06F 7/04 | (2006.01) |
| H04L 29/06 | (2006.01) |
| G06Q 40/00 | (2006.01) |
| G06Q 20/00 | (2006.01) |
| H04M 1/66 | (2006.01) |
| H04W 4/00 | (2009.01) |
| G07C 13/00 | (2006.01) |
| H04K 1/00 | (2006.01) |
| H04L 9/00 | (2006.01) |
| H04L 29/08 | (2006.01) |
| H04L 12/56 | (2006.01) |
| H04M 3/42 | (2006.01) |

(52) U.S. Cl. ............... 726/8; 705/44; 705/67; 713/153; 455/410; 455/461; 370/329

(58) Field of Classification Search ........ 726/8; 705/44, 705/67; 713/153; 455/410, 461; 370/329
See application file for complete search history.

(56) References Cited

U.S. PATENT DOCUMENTS

| | | | | |
|---|---|---|---|---|
| 5,729,537 | A | * | 3/1998 | Billstrom ...................... 370/329 |
| 5,850,517 | A | | 12/1998 | Verkler et al. |
| 6,157,941 | A | | 12/2000 | Verkler et al. |

(Continued)

FOREIGN PATENT DOCUMENTS

JP            11-120238            4/1999

(Continued)

OTHER PUBLICATIONS

Robson Eduardo De Grande, Sérgio Donizetti Zorzo; Privacy protection without impairing personalization by using the extended system MASKS and the extended contextualized P3P privacy policies; Nov. 2006; WebMedia '06: Proceedings of the 12th Brazilian Symposium on Multimedia and the web; Publisher: ACM; pp. 89-98.*

(Continued)

Primary Examiner — Eleni Shiferaw
Assistant Examiner — Courtney Fields
(74) Attorney, Agent, or Firm — Kilpatrick Townsend & Stockton LLP

(57) ABSTRACT

Methods and systems are disclosed for personalization and identity management. In one embodiment, the method comprises receiving, from an access provider, a message for a service provider, the message associated with a first identifier of a user of the access provider. A second identifier is obtained, the first identifier is disassociated from the message, and the second identifier is associated with the message. The message associated with the second identifier is then sent to the service provider.

32 Claims, 6 Drawing Sheets

U.S. PATENT DOCUMENTS

| | | | |
|---|---|---|---|
| 6,374,305 | B1 | 4/2002 | Gupta et al. |
| 6,944,760 | B2 * | 9/2005 | Wills .............................. 713/153 |
| 7,139,799 | B2 * | 11/2006 | Qian et al. ..................... 709/205 |
| 7,340,438 | B2 * | 3/2008 | Nordman et al. ............... 705/64 |
| 2002/0087674 | A1 | 7/2002 | Guilford et al. |
| 2002/0178122 | A1 | 11/2002 | Maes |
| 2002/0184373 | A1 | 12/2002 | Maes |
| 2002/0191795 | A1 | 12/2002 | Wills |
| 2002/0194388 | A1 | 12/2002 | Boloker et al. |
| 2002/0198719 | A1 | 12/2002 | Gergic et al. |
| 2002/0198991 | A1 | 12/2002 | Gopalakrishnan et al. |
| 2003/0023953 | A1 | 1/2003 | Lucassen et al. |
| 2003/0046316 | A1 | 3/2003 | Gergic et al. |
| 2003/0140225 | A1 | 7/2003 | Banks et al. |
| 2005/0054325 | A1 * | 3/2005 | Morper ......................... 455/410 |
| 2005/0164704 | A1 * | 7/2005 | Winsor ....................... 455/432.3 |
| 2005/0192035 | A1 * | 9/2005 | Jiang ............................. 455/461 |

FOREIGN PATENT DOCUMENTS

| | | |
|---|---|---|
| WO | WO 01/65380 A1 | 9/2001 |
| WO | WO 02/33516 A2 | 4/2002 |
| WO | WO 02/33516 A3 | 4/2002 |
| WO | WO 02/102016 A2 | 12/2002 |
| WO | WO 02/102016 A3 | 12/2002 |
| WO | WO 2005048201 A1 * | 5/2005 |

OTHER PUBLICATIONS

Maes, Stephanie, Multi-modal Web IBM Position W3C/WAP Workshop, IBM Research Human Language Technologies, downloaded http://www.w3.org on May 26, 2003, 9 pages.

Maes, Stephanie, Multi-modal Browser Architecture, Overview on the support of multi-modal browsers in 3GPP, IBM Research Mobile Speech Solutions and Conversational Multi-modal Computing, downloaded http://www.w3.org on May 26, 2003, 25 pages.

Sundsted. Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Liberty Architecture Overview, Liberty Alliance Project Version 1.1, Piscataway New Jersey, Jan. 15, 2003, 44 pages.

Parlay APIs 4.0, Parlay X Web Services White Paper, The Parley Group: Parlay X Working Group, Dec. 16, 2002, 12 pages.

Single Sign on Deployment Guide, Introduction to Single-Sign-On, Netscape 6 Documentation Training Manual hhtp://developer.netscape.com/docs/manuals/security/SSO/sso.htm on May 26, 2003, 5 pages.

Website printout entitled "Microsoft .net Passport: One easy way to sign in online." downloaded from www.passport.net/Consumer/default.asp?rollrs=11&Ic=1033 on Dec. 10, 2004, 2 pages.

* cited by examiner

METHOD AND APPARATUS FOR PERSONALIZATION AND IDENTITY MANAGEMENT

CROSS-REFERENCES TO RELATED APPLICATIONS

This application claims the benefit of U.S. Provisional Application Ser. No. 60/530,599 entitled "Method and Apparatus for Personalization and Identity Management", filed Dec. 17, 2003, which is incorporated herein by reference.

BACKGROUND OF THE INVENTION

The present invention generally relates to identity management in e-business. More specifically, the present invention relates to identity management, authentication, user preference and profiles that may be accessed from different locations and different devices, such as in the mobile space.

Various techniques have been used to manage user identities. Typically, to gain access to a network application or server, a user provides the application or server provider with identity information that identifies the user. The user is then given an login identifier that may be used to access the application or server. In some instances, the application/server may also create a user profile which stores preferences of the user. The application provider may send a cookie or authentication token to the application (e.g., web browser) or device (e.g., user's machine) that the user is using to access the application. Thus, information, such as login identification, user preferences, transaction history, etc., may be saved for the next time the user accesses the network application. However, the user's personalization information (user preferences, transaction history, etc.) cannot be shared across different providers. Additionally, the user identification is known to the service provider.

Other existing technologies allow a user to use one login identifier to access multiple applications. One example of this technology is a Single-Sign-On (SSO), such as Oracle Single Sign-On Offerings. The SSO is valid for one session between applications that have the particular SSO "hard coded" in the program code. As the SSO is valid for only the single session, personalization of the applications is not provided by the SSO. Furthermore, the user identity is known to all of the applications.

Another existing approach includes use of a centralized identity management across different service providers, such as Microsoft® Passport technology. The service provider must include program code in the application that allows the identity/authentication provider to authenticate the user. The customer must then use the single identity/authentication provider to logon to the services. This may increase the risk of privacy issues and violations. Furthermore, service providers then become tied to the identity/authentication provider. This may be perceived as an unacceptable monopoly risk to some service providers, especially telecommunication, mobile network operators (MNOs) and banking providers.

Federated identity management is another approach that may provide for distributed single sign-on across providers. One such federation is the Liberty Alliance Project, with an overview being available at their website projectliberty.org. Federated identity management allows the authentication of a user by a member of the federation to serve as the authentication for other members of the federation. However, there is no mechanism provided that allows for masking of the user identity or for sharing of user preferences or other user personalization information across providers.

BRIEF SUMMARY OF THE INVENTION

Methods and systems are disclosed for personalization and identity management. In one embodiment, the method comprises receiving a message for a service provider from an access provider, such as a mobile network operator or wireless network provider. The message is associated with a first identifier of a user of the access provider. A second identifier is obtained. The first identifier is disassociated from the message and the second identifier is associated with the message. The message associated with the second identifier is then sent to the service provider. In some embodiments, an indication that the second identifier has been authenticated may also be sent to the service provider.

In some embodiments, the method may include retrieving personalization information associated with the second identifier and sending a subset of the personalization information to the service provider. By way of example, the personalization information may include user preferences, user device characteristics, user device capabilities, user device settings, user device addresses, and other user personalization information. The method may optionally include a determination that the service provider is authorized to have the personalization information before the information is sent. Personalization information may have been received from the user, the service provider, and/or derived from user history.

Alternately, or additionally, the method may also include associating a session to the second identifier and associating the message received from the access provider to the session. The message and one or more additional message(s) received from the access provider, which are associated to the first identifier, may be evaluated for session management information. The session management information may be stored for future retrieval in the event the connection to the service provider is lost and re-established.

Subsequent to receiving the message from the access provider, a message may be received for the service provider from a second access provider. The message may be associated with a third identifier of the user. The method may then include determining the third identifier is mapped to the first identifier. The third identifier is disassociated from the message and the second identifier is associated with the message. The second message associated with the second identifier is sent to the service provider.

In an alternate embodiment, the method may comprise receiving a message from a mobile network operator for a service provider. The received message may be associated with a MSISDN of a user. An identifier is obtained and authenticated. The MSISDN is disassociated from the message and the obtained identifier is associated with the message. The message is then sent to the service provider with an indication the identifier has been authenticated. Personalization information indicating preferences of the user is also sent to the service provider.

In a third embodiment, a system is disclosed. The system comprises an identity component, configured to disassociate a first identifier of a user from a message received from an access provider. The identity provider is also configured to obtain an identifier for a user of an access provider and to associate the second identifier with the message. The system further comprises an authentication component, which is configured to authenticate the second identifier and to associate an indication with the message the second identifier has been authenticated. A communications interface is configured to send the message associated with the second identifier and the indication to the service provider.

A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
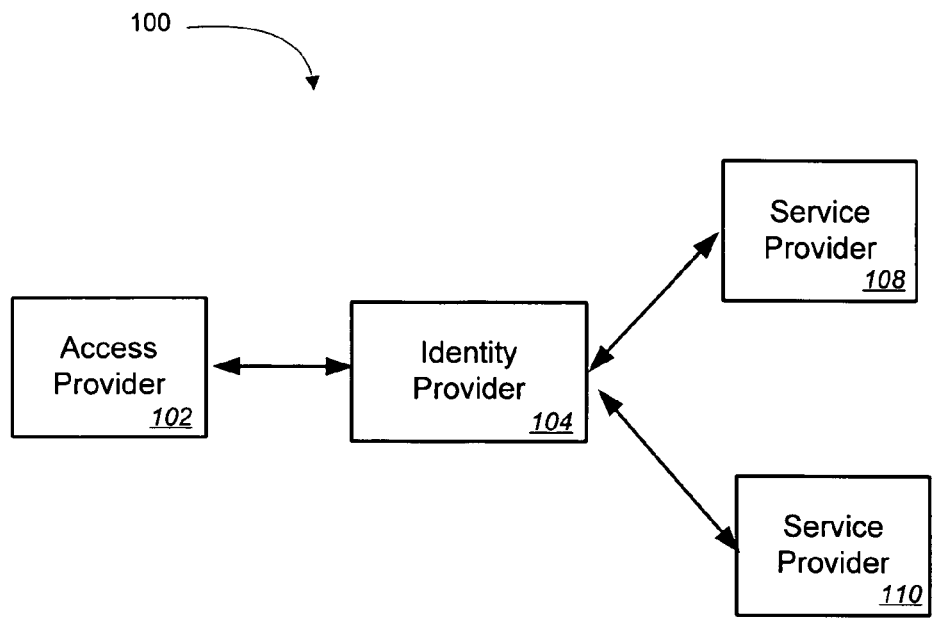
FIG. 1 illustrates an exemplary embodiment of a system that uses identity management.

FIG. 1 illustrates an exemplary embodiment of a system that may be used to provide identity management to a user. A user may use an access provider 102 to access a network. The network may be a local area network (LAN), a wide area network (WAN), a wireless network, or other type of network. Thus, the access provider 102 may be an Internet Services Provider, a mobile network operator (MNO) or other type of provider to a wireless communications network, a provider to a wireless network (e.g., General Packet Radio Service (GPRS) network, a WiFi network, 2.5G, EDGE, UMTS, 3G, CDMA, FOMA, etc.). In some embodiments, the user may be accessing the network from a device that is mobile. By way of example, the mobile device may be a laptop, a personal data assistant (PDA), a mobile telephone, or other type of device. In other embodiments, the user device may be relatively stationary, such as a personal computer.

A user may use the network access provided by access provider 102 to interact with one or more service providers 108, 110. A variety of different types of services may be offered by a service provider 108, 110. For instance, a service provider 108, 110 may provide email services, voice mail services, messaging services (e.g., text messaging, instant messaging, MMS, voice chat, etc.), or application services. By way of example, application services may include a web site that allows the user to purchase goods or services; an application to find the location, presence or availability of somebody; an application to synchronize data with a repository; an application to provision/manage the life cycle of data, applications, or devices; or an application to access a particular domain. It should be appreciated that a wide range of other types of services may also be provided by a service provider 108, 110.

The user device (not illustrated) has an associated identifier which allows access provider 102 to send messages to it. By way of example, an identifier may be a network interface card (NIC), a mobile identification number (MIN), mobile station ISDN (MSISDN), EMI, SIM information, or USIM information. Messages sent from the user device to service providers 108, 110 via access provider 102 generally have the identifier associated with the message so that the service provider 108, 110 may send messages back to the user. However, in some instances, for privacy, or other reason, the user may not want the service provider to know the identifier. For example, a user of a mobile telephone may not want the service provider 108, 110 to know the user's mobile identification number.

Identity provider 104 may be used to mask the address of a user from the service providers 108, 110. As will be described in further detail below, the identity provider 104 may obtain a different identifier for the user. Identity provider 104 may disassociate the first identifier from messages sent from the user and in replacement, associate the messages with a second identifier. The messages associated with the second identifier may then be sent to the service provider 108, 110 to which the message was directed. In some instances, identity provider 104 may also authenticate the second identifier and send an indication along with the message that the second identifier has been authenticated. Service providers 108, 110 route messages back to the user to identity provider 104. Identity provider may then replace the second identifier associated with the messages received from service provider 108, 110 with the first identifier and send the message to access provider 102 for delivery to the user. Thus, the user may conduct transactions with a service provider 108, 110 without providing any identification information, such as the user device address, name, email address, phone number, or other identifying information.

Figure 2:
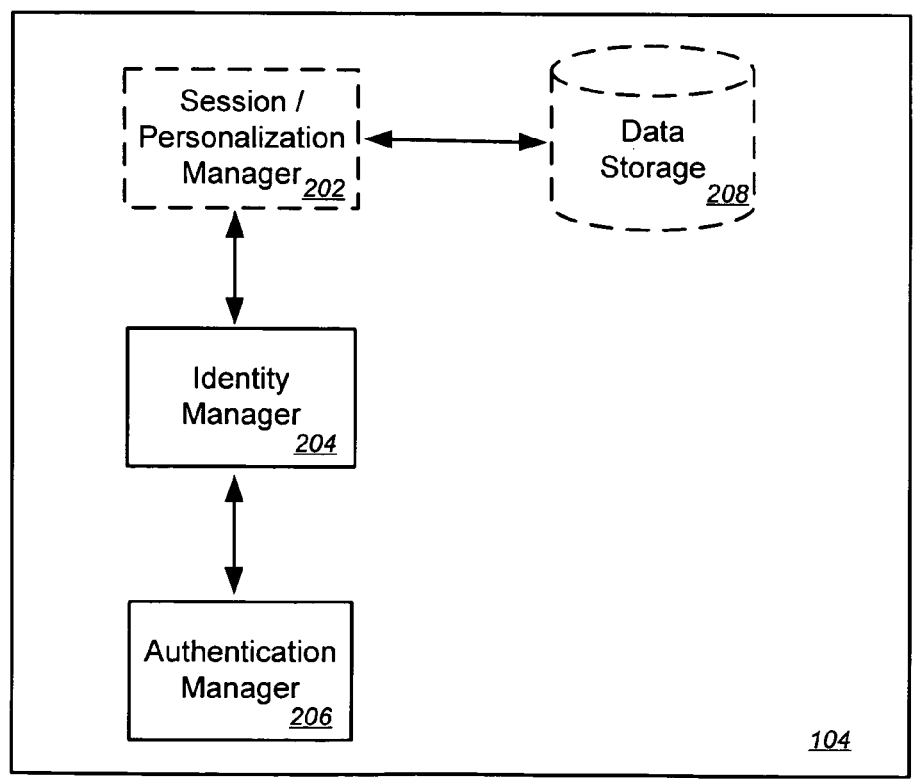
FIG. 2 illustrates an exemplary embodiment of the identity provider of FIG. 1.

FIG. 2 illustrates an exemplary embodiment of an identity provider 104. The identity provider 104 includes an identity manager 204. The identity manager 204 may be used to obtain a identifier for a user for the purposes of masking the user identification from a service provider 108, 110. In some instances, a new identifier may be created for the user address. In other instances, the identity manager 204 may determine that an identifier already exists for the user. For example, the identifier used for masking may have already been assigned to another identifier of the user. As another example, the identifier may be assigned to multiple additional identifiers for the same user (e.g., a user using multiple access providers and/or devices), each of which are mapped to the identifier. The same identifier may be used to access multiple service providers 108, 110. Alternately, different identifiers may be obtained for each service provider to mask the identity of the user from the service provider.

The identity manager 204 may then pass the identifier used for masking to an authentication manager 206 to authenticate the identifier. This may be done based on credentials received from access provider. Credentials may include tokens, cookies digital certificates, SIM authentication, or other types of tokens. In some instances, challenge responses may be sent to the user device to authenticate the user. After the identifier has been authenticated, the authentication manager 206 may then notify the identity manager 204 the identifier has been authenticated. Identity manager 206 may then transmit messages associated with the identifier, with an indicator the identifier has been authenticated.

In one embodiment, identity manager 204 may receive messages from access provider 102, mask the user identity, and send the messages with the masked identification to service provider 110. Identity manager 204 may also be used to route messages received from service provider 108, 110 to the user by replacing the masked identifier associated with the messages with the user's identity for the access provider. Thus, when the masked identifier is mapped to multiple user identities for one or more access providers, the identity manager 204 may keep track of the current identifier to use to send messages.

In other embodiments, messages may be sent to an intermediary such as session/personalization manager 202, which may use identity manager 204 to obtain a masked identification for the user. Thus, identity provider 104 may optionally include session/personalization manager 202 or other type of intermediary to receive messages from access provider 102, obtain an masked identifier from identity manager 102, replace the access provider's identification of the user with the masked identifier, and send the message to the service provider 108, 110. As previously described, identity manager 102 may authenticate the masked identifier; thus, the session/personalization manager 202 (or other type of intermediary) may also send indications with the message(s) that the identifier used for masking has been authenticated. Session/personalization manager 202 or other type of intermediary may also be used to re-route messages received from service provider 108, 110 to the user by replacing the identifier with the access provider's identification of the user.

Session/personalization manager 202 may also be used to share user personalization information across multiple service providers 108, 110 and/or to perform session management in the event a user switches to a different access provider or uses a different device to access the service provider 108. A detailed description of how session management may be performed when a user roams (switches access providers) or uses a second device to access a service provider may be found in application Ser. No. 10/856,560 filed May 28. 2004, entitled "ROAMING ACROSS DIFFERENT ACCESS MECHANISMS AND NETWORK TECHNOLOGIES", issued Jan. 23, 2007 as U.S. Pat. No. 7,167,705, the details of which are hereby incorporated by reference.

The identifier assigned to the user may be associated to a session for service provider 108, 110. Messages from the user to the service provider 108, 110 received over a predetermined period of time (the user session with the service provider) may then be associated to the session. Session manager 202 may evaluate the messages for session management information. The session management information may include data representing a state of the interaction between the user and the service provider, user preferences within a state or session, and/or other types of session information. As will be described in more detail below, session management information may be used to support different types of roaming by the user (e.g., suspend and resume, connect/intermittently disconnected/disconnect, and multi-device roaming). Session/personalization manager 202 may use data storage 208 to store the session management information.

Additionally, session/personalization manager 202 may manage user personalization information. Session/personalization manager 202 may retrieve personalization information associated with the identifier from data storage 208. A subset of the personalization information may be sent to service provider 108, 110. In some instances, the subset may include all of the personalization information, while in other instances, only personalization information applicable to the service provider 108, 110 or for which the service provider 108, 110 is authorized to have, may be sent. In embodiments in which different identifiers for each service provider 108, 110 are provided to mask the user's identity, the personalization information may be mapped to all of the identifiers so that personalization information may be shared across multiple service providers 108, 110. Alternately, a subset of generic personalization information may be mapped to each of the multiple identifiers, while application-specific personalization information may only be mapped to the identifier for the service provider 108, 110 of the specific application.

Personalization information may include a variety of different types of information. For instance, personalization information may include generic user preferences, preferences or other personalization information related to applications, such as payment information or preferences (e.g., M-commerce, e-Wallet, or other information specifying the user preferences and accounts used to make payments), application settings, account information, contact/address book information, or other types of application specific information. Personalization information may also include information related to devices, such as device settings, unified messaging (UM) priority list on where/how to be contacted, or privacy rules). Other examples of personalization information include user credentials, user subscriptions to services including preferences and privacy settings, user devices (e.g., device characteristics/capabilities, device settings, device addresses, etc.), network /access mechanisms characteristics (e.g., multi-channel, multimodal, voice, etc.), and other types of information storing preferences or other information about the user. The user personalization information may be explicitly set or provided by the user. Alternately or additionally, session/personalization manager 202 may derive preferences or personalization information from messages sent between user and service providers 108, 110. In embodiments in which the session/personalization manager 202 derives personalization management, Platform for Privacy Preferences (P3P) may be used for some applications to determine the type of information that is being transmitted by the messages.

Session/personalization manager 202 may send personalization information to a service provider 108, 110 at the time the user initiates a session with the service provider or at other times, such as during an on-going session, that preference information may be used to establish a context related to the user. The personalization information may also or alternately be sent in response to receiving a request form the service provider 108, 110. For example, the session/personalization manager 202 may have previously received one or more cookies associated with the identifier from a service provider 108, 110. Instead of forwarding the cookies to the user device, the session/personalization manager 202 may store the cookies in data storage 208. When the service provider requests the cookie(s), session/personalization manager 202 may retrieve the cookie(s) from data storage 208 and send the cookie(s) to the service provider 108, 110. Thus, session/personalization manger 202 may serve as a cookie proxy for the service provider. Other types of personalization information may also be sent at the service provider's 108, 110 request.

A variety of techniques may be used to ensure that the service provider 108, 110 only receives authorized personalization information. For example, a service provider may have access to personalization information indicating application settings, such as background color, but not have any access to identity information. Before sending personalization information, the session/personalization manager 202 may therefore determine whether the service provider 108, 110 is authorized to have the personalization information. Session/personalization manager 202 may request authorization from the user before sending information (e.g., via a "pop-up" message), or may consult rules (either default or set by the user) to determine what types of information may be sent. In some embodiments, service providers 108, 110 may have access to data storage 208, but the information may be filtered so that only authorized information may be viewed, retrieved, or modified by service provider 108, 110. Other mechanisms may also be used to prevent unauthorized accessing or sending of personalization information.

It should be appreciated that in alternate embodiments, the identity provider 104 may be different than that depicted in FIG. 2. For instance, identity provider 104 may not include an authentication manager 206 and may instead use an authentication manager provided by a third party. As another example, session/personalization manager 202 may be separate components or may only provide either session or personalization management, but not both. As a third example, a different data storage may be used to store personalization information than the data storage used to store session management information. Other alternations are also contemplated.

One example embodiment in which a user may use identity provider 104 to mask identities is for interactions with a payment provider. The user may login to a merchant site using an identity manager, such as described with FIG. 1, to mask identity. After the user selects the items for purchase and is ready to pay, the merchant may send the user's masked identity to a payment provider. The merchant may also send other personalization, preference, or profile information. The payment provider may then use a protocol such as 3-Domain Secure protocol to obtain authentication for the user. In some embodiments, the identity manager may be used to authenticate the user. Thus, the payment provider may only know that the user has been authenticated and may not know the user identity, payment authorization, or account information. If needed, the payment provider may interact with the user through identity manager for confirmation or other information needed to authorize the transaction. Upon completion, payment provider may request that identity manager bill the account setup by the service provider. The identity provider 104 may then send the user a bill for the payment amount or may send the bill information to the access provider 102 for combination with the access provider bill. Alternately, the payment provider may send a bill notification to the user using identity manager (e.g., sending an email).

Figure 3:
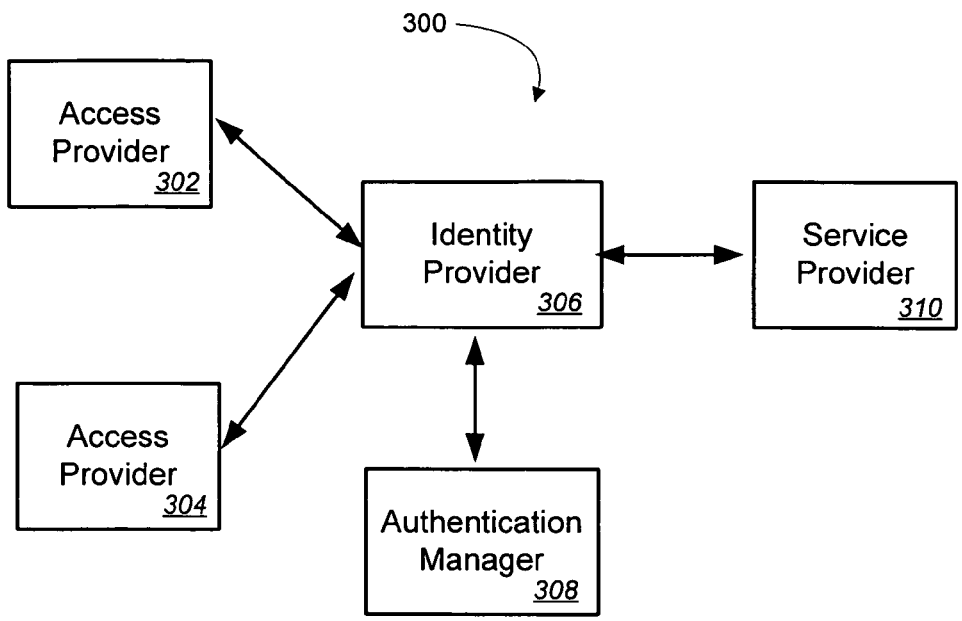
FIG. 3 illustrates a second exemplary embodiment of a system that uses identity management.

FIG. 3 illustrates an exemplary system 300 that may be used to support identification masking for a user when the user switches access providers. The user may switch from an access provider 302 to a second access provider 304 in a variety of circumstances. For instance, the user may be using a mobile device (e.g., mobile telephone) which roams to a different network. As another example, the user may switch from one type of access provider (e.g., from a General Packet Radio Service (GPRS) access provider) to a second type of access provider (e.g., a WiFi provider). The user may also switch access providers when switching from a first device to a second device that uses a different access provider to access a network. The user may also switch between access providers on various other occasions, such as when switching from one WiFi network to another or switching from WiFi to 3G or GPRS. Sometimes, when the user switches to a different access provider, the identity of the user for the different access providers may stay the same. By way of example, when roaming from one MNO network to a second MNO network, the user's identification (e.g., the MSISDN number) remains the same. In other instances, the user may change identities, such as when switching devices or switching to a different type of access provider.

FIG. 3 illustrates an embodiment in which both access providers 302, 304 use the same identity provider 306 to provide identity management. After the user has switched access providers 302, 304, the identity manager 306 receives one or more message(s) for service provider 310 from the second access provider. If the user identity for the second access provider has not changed from the identity for the first access provider, the identity manager 306 may continue to disassociate the access providers' identification of the user from messages sent from the user to the service provider 310 and associate the masked identifier mapped to the access provider's identification of the user (which was obtained when messages were received from access provider 302) with the messages. Messages sent from service provider 310 to the identifier are routed to the user via the second access provider 304 using the access provider's identification of the user.

In many instances, the user's identity will change when switching from the first access provider 302 to the second address provider 304. In some embodiments, the access providers 302, 304 may be members of a federation in which the access providers 302, 304 have agreed that authentication for user identity for one member (access provider 302) will serve as authentication for an identity maintained by a different member (access provider 304). Thus, identity provider 104 (e.g., in an identity manager 204 component) may maintain a mapping of the identifiers a user has with various access providers 302, 304. As the identity provider 104 maintains this information, the access providers 302, 304 may not know the identities the user has with other access providers. The user may also provide some of the mappings to identity provider 306.

After receiving a message associated with a third identifier of a user (the identifier used by a second access provider) via the second access provider 304, the identity provider 306 determines the third identifier is mapped to the first identifier associated with messages received from the first access provider 302. The identity provider 306 then disassociates the third identifier from the message and associates the second message with the masked identifier which was mapped to the first identifier. The message associated with the masked identifier is then sent to service provider 310.

In some embodiments, the user may switch devices, but use the same access provider. In those embodiments, the messages associated with the third identifier may have been sent from the same access provider. The identity provider 306 may use mappings to determine the masked identifier associated with the first identifier should also be used to mask the identity of the third identifier. Additionally, as was previously described, in some embodiments, identity provider 306 may also provide session and/or personalization management. When the user switched access providers 302, 304 (or switched to a different address), the connection to service provider 310 may have been terminated. After the connection has been re-established by the second access provider, the identity provider 306 may determine the masked identifier is associated with a session with the service provider. The identity provider 306 may then send (or otherwise make available) session management information to the service provider 310. Thus, the user may resume interactions with the service provider 310 at the same, or close to the same, state as when the connection was terminated.

Figure 4:
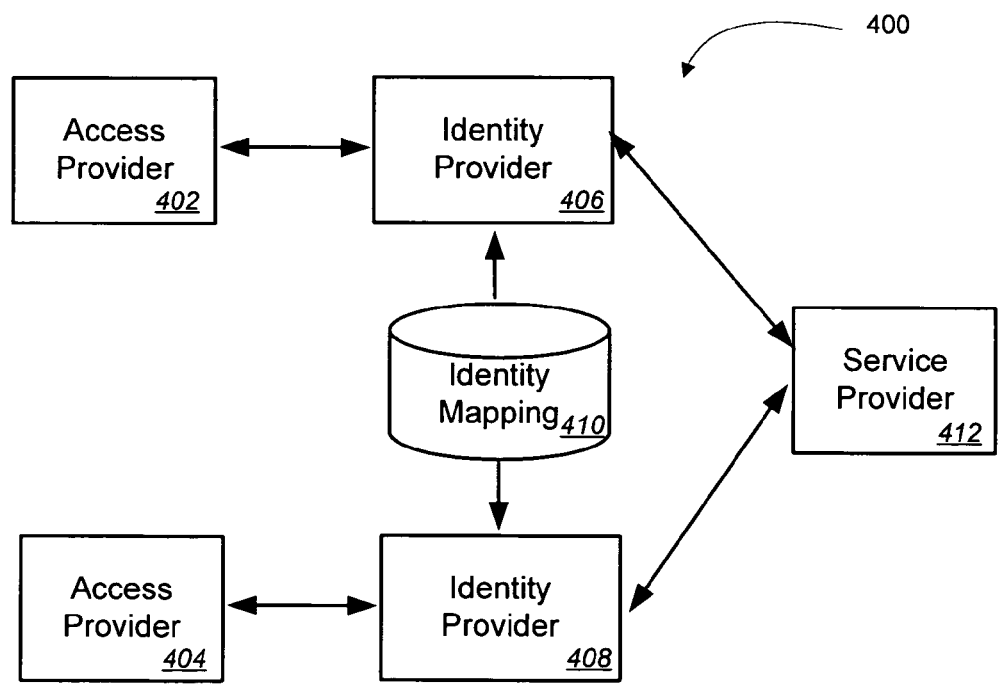
FIG. 4 illustrates a third exemplary embodiment of a system that uses identity management.

FIG. 4 illustrates a second exemplary embodiment of a system 400 that may be used to support identification masking for a user when the user switches access providers. In this embodiment, the access providers 402, 404 use different identity providers 406, 408. The access providers 402, 404 may have a federation agreement that allows identity providers 406, 408 to have access to mapping information which associates the identities a user has with various access providers 302, 304. The system includes a data storage 410 which is reachable by both access providers 402, 404. The data storage 410 may be used to store mappings between the user's identities with various access providers to one or more masked identifiers used for interacting with service providers.

After identity provider 406 has obtained a masked identifier for a first identifier associated with access provider 402, the identity provider 406 may store the mapping from the first identifier to the masked identifier in data storage 410. Thus, when the second identity provider 408 receives a message from access provider 404 associated with the third identifier (used by the second access provider), it may first consult the data storage 410 to determine if a masked identifier has been assigned to the third identifier. In some embodiments, the data storage 410 may also map different identities that the user has with different access providers 402, 404. In these embodiments, a search for a masked identifier associated with the third identifier may return the masked identifier assigned to the first identifier (used by the first access provider). Alternately, access provider 404 may search data storage using all the different identities associated with the third identifier of the user. The access provider 404 may then use the same masked identifier mapped to the first identifier to mask the third identification of the user from transactions with the service provider 412.

In addition to the mappings which map the masked identifiers assigned by identity providers 406, 408 to identities a user has with one or more access providers 402, 404, data storage 410 or a different data storage may also store session or personalization information mapped to the identifier. Thus, identity provider 408 may send the session and personalization information to service provider 412 as needed or requested. Alternately, identity providers 406, 408 may not have direct access to the session/personalization information stored by the other identity provider. In these embodiments, the second identity provider 408 may request that the first identity provider 406 send the session and personalization information to the second identity provider 408 or to the service provider 412.

Figure 5:
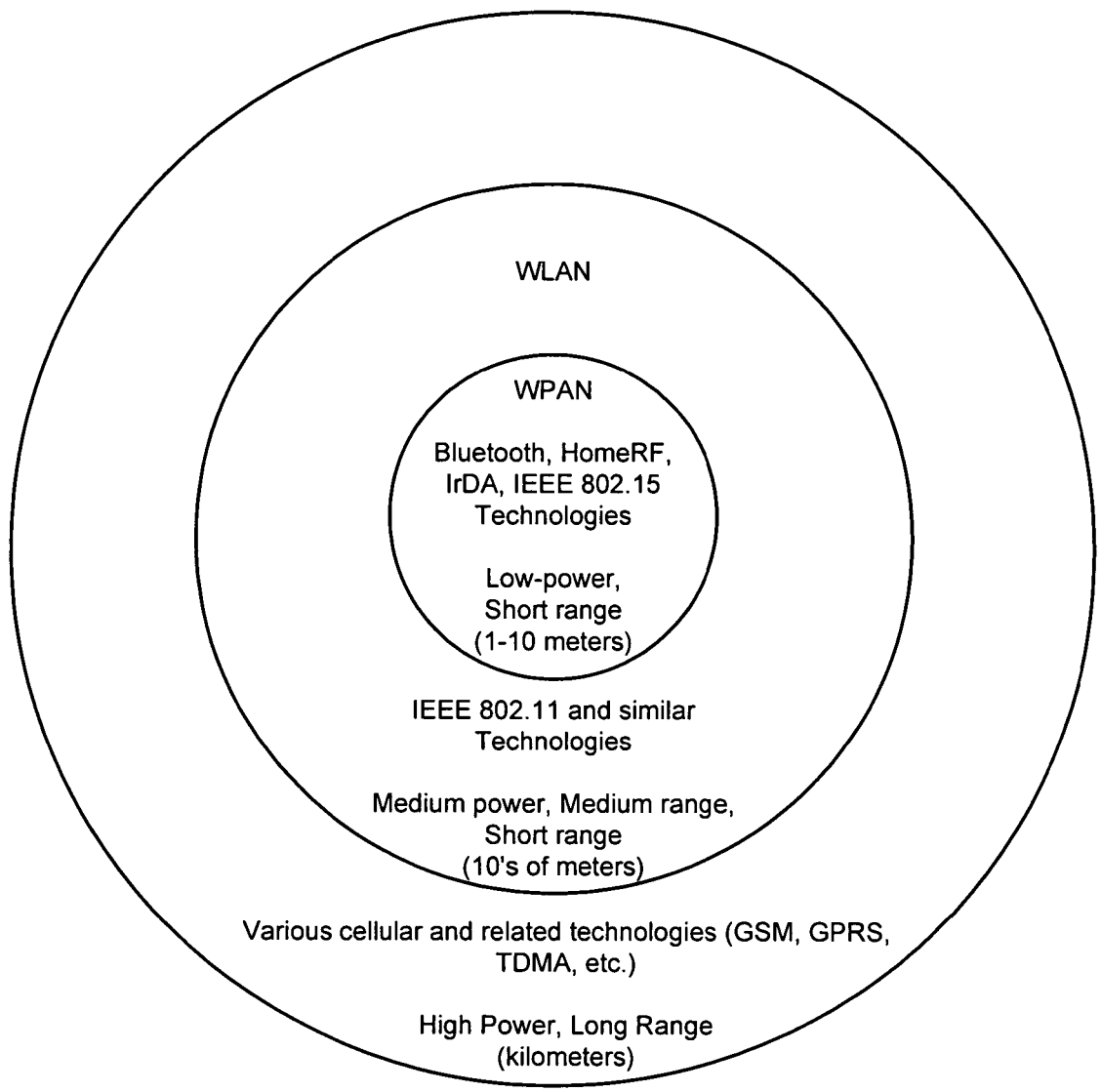
FIG. 5 illustrates a simplified comparison of several currently available mobile network technologies.

FIG. 5 illustrates exemplary wireless networks with may be accessed by a user via an access provider. Wireless network technologies include wireless wide area network (WWAN), wireless local area network (WLAN) and wireless personal area network (WPAN) technologies. WWAN technologies typically include cellular and related technologies such as GSM, GPRS, CDPD, CDMA, TDMA, WCDMA, etc. WWAN networks are high power, long range networks that typically have an access range on the order of several kilometers on up. WLAN technologies, on the other hand, are medium power, medium range networks that have an access range on the order of tens of meters while WPAN networks are low power, short range networks that typically have an access range of about 10 meters or less. Examples of WLAN technologies include the IEEE 802.11(a), (b), (e) and (g) technologies and examples of WPAN technologies include Bluetooth, HomeRF, IrDA and IEEE 802.15 technologies. It should be appreciated that networks, other than wireless networks, may be made accessible to a user via an access provider.

Figure 6:
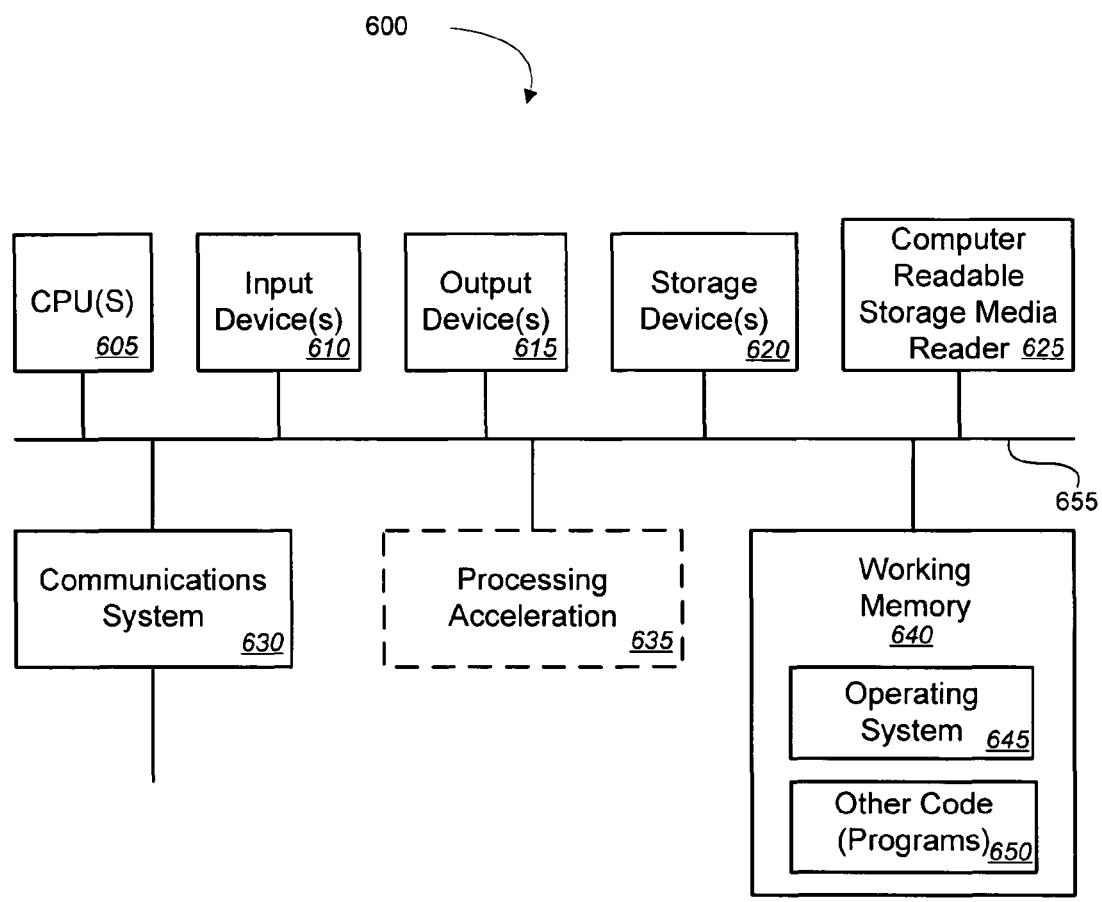
FIG. 6 is a block diagram of a computer system upon which an identity provider may be implemented.

FIG. 6 illustrates one embodiment of a computer system 600 upon which a identity provider (or components of an identity provider) may be implemented. The computer system 600 is shown comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage device 620. By way of example, storage device(s) 620 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. In some embodiments, the computer system 600 may also include a processing acceleration unit 635, which can include a DSP, a special-purpose processor and/or the like The computer-readable storage media reader 625 can further be connected to a computer-readable storage medium, together (and, optionally, in combination with storage device (s) 620) comprehensively representing remote, local, fixed, and/or removable storage devices plus storage media for temporarily and/or more permanently containing computer-readable information. The communications system 630 may permit data to be exchanged with a network and/or any other computer.

The computer system 600 may also comprise software elements, shown as being currently located within a working memory 640, including an operating system 645 and/or other code 650, such as an application program. The application programs may implement an identity provider, components of the identity provider, and/or the methods of the invention. It should be appreciate that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Figure 7:
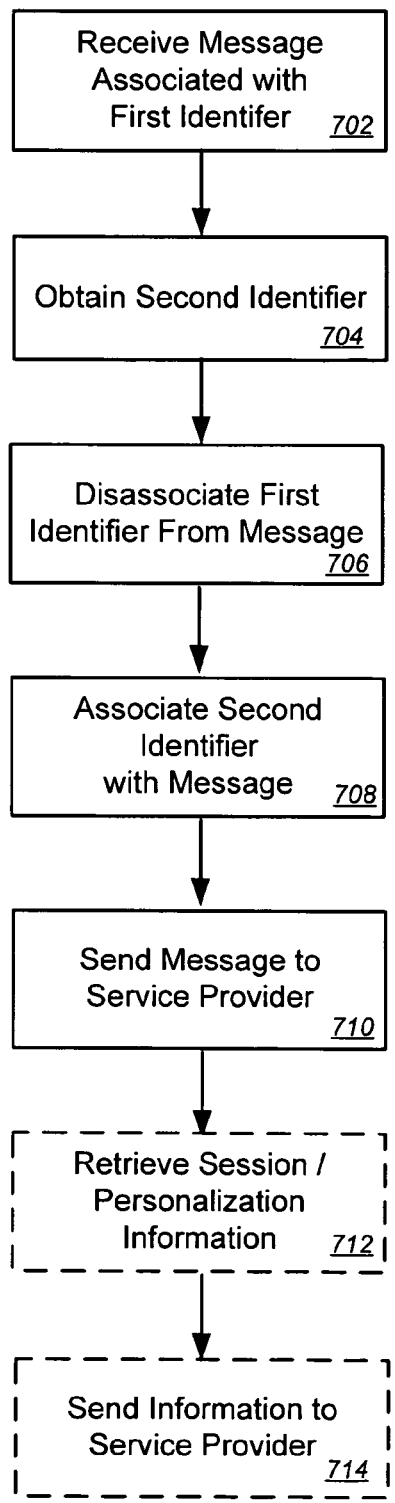
FIG. 7 is a flow diagram illustrating a method of masking user identification.

FIG. 7 illustrates an exemplary method that may be used to mask user identification. The method may begin by receiving 702 a message for a service provider. The message is associated with a first user identifier and may be received from an access provider which provides a user device access to a network. A second identifier, which will be used to mask the user identity, is obtained 704. The second identifier may be obtained 704 by an identity provider (e.g., an identity manager 204 component). The second identifier may have been previously obtained and mapped to the first identifier or a third identifier mapped to the first identifier, which is also associated with the user. Alternately, a new identifier may be created and used for the second identifier.

The first identifier associated with the message is disassociated 706 from the message and the obtained second identifier is associated 708 with the message in its place. Thus, the second identifier may be used to route messages back to an identity provider, which will replace the second identifier with the first identifier and send to the access provider for forwarding to the user. After the second identifier has been associated with the message, the message is sent 710 to the service provider.

In some embodiments, session and/or personalization information may also be retrieved 712. The session information may have been session information for a session associated with the obtained second identifier. The session information may be sent 714 to the service provider so that the user may resume interactions with the session provider in the previous state indicated by the session information. Personalization information may also be sent 714 to the service provider which specifies user preferences, device capabilities, and other user personalization information. Alternately, the service provider may have access to personalization information (or a subset of the personalization information) associated with the identifier.

Figure 8:
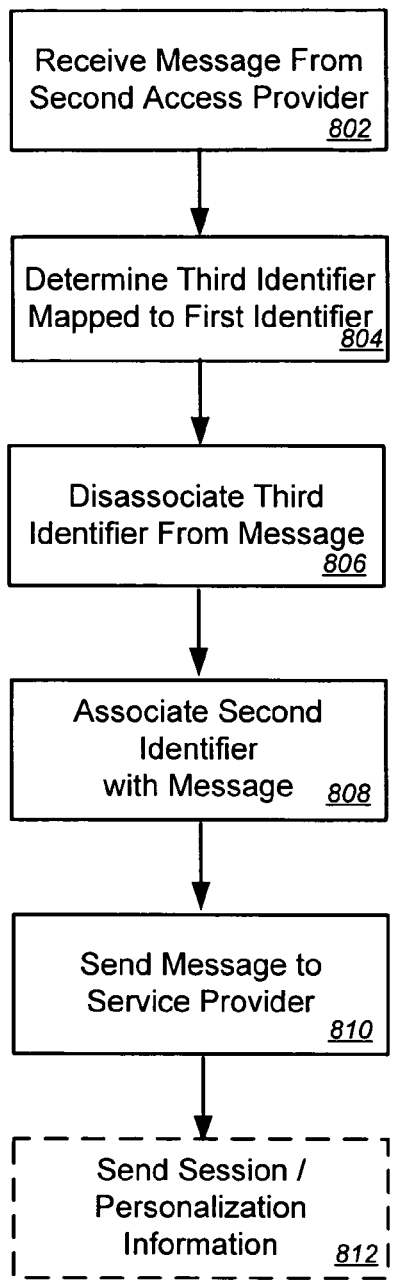
FIG. 8 is a flow diagram illustrating identity management for a user switching access providers.

FIG. 8 illustrates an exemplary method that may be used to perform identity management when a user switches access providers. Subsequent to the receipt 702 of one or more messages from a first access provider, a message may be received 802 from a second access provider. The message may be associated with the same user identifier that is used by the first access provider. For example, this may occur when the user roams to a different network or switches to a different device which uses a different access provider to access the network. Alternately, the third identifier of the user associated with the message received from the second access provider may different from the first identifier associated with messages received from the first access provider. After the message has been received 802, a determination may be made that the third identifier is mapped to the first identifier associated with messages received 702 from the first access provider.

The third identifier is disassociated 806 from the message. The masked identifier obtained 704 for the messages associated with the first identifier is associated with the message from the second access provider. The message is then sent 801 to the service provider. Optionally, session and/or personalization information may also be sent 812.

In the foregoing description, for the purposes of illustration, methods were described in a particular order. It should be appreciated that in alternate embodiments, the methods may be performed in a different order than that described. Additionally, the methods may include fewer, additional, or different blocks than those described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   receiving into an identity provider, from a first access provider, a first message for a first service provider, the first access provider providing access to a communication network to a device of a user, the first service provider providing one or more services to the user of the communication network, and the first message associated with a first identifier corresponding to a user of the first access provider, the first identifier identifying the user allowing the user to access and communicate with the first access provider; and
   in response to receiving the first message from the first access provider:
      obtaining by the identity provider a second identifier on behalf of the user;
      disassociating by the identity provider the first identifier from the first message;
      associating by the identity provider the first message with the second identifier; and
      sending from the identity provider the first message associated with the second identifier to the first service provider, the second identifier providing for communication with the first service provider while masking identity information for the user and the device of the user contained within the first identifier;
   retrieving by the identity provider personalization information associated with the second identifier, wherein the personalization information comprises one or more of user preferences, user device characteristics, user device capabilities, user device settings, and user device addresses;
   sending from the identity provider a first subset of the personalization information to the first service provider;
   receiving into the identity provider, from a second access provider, a second message for the first service provider, the second message associated with a third identifier of the user of the second access provider; and
   in response to the second message from the second access provider:
      determining by the identity provider the third identifier is mapped to the first identifier;
      disassociating by the identity provider the third identifier from the second message;
      associating by the identity provider the second message with the second identifier;
      sending from the identity provider the second message associated with the second identifier to the first service provider; and
      sending from the identity provider the first subset of the personalization information to the first service provider.

2. The method of claim 1, wherein sending the personalization information is in response to receiving a request from the first service provider to access the portion of the personalization information.

3. The method of claim 2, wherein receiving the request from the first service provider comprises receiving a request from the first service provider to obtain a cookie, the request associated with the second identifier.

4. The method of claim 1, wherein sending the personalization information comprises receiving authorization from the user to send the personalization information.

5. The method of claim 1, wherein sending the personalization information comprises determining the personalization information may be shared with the service provider.

6. The method of claim 1, wherein the personalization information comprises one or more of user preferences related to the first service provider and generic user preferences.

7. The method of claim 1, wherein the personalization information comprises account information.

8. The method of claim 1, wherein the personalization information comprises payment information.

9. The method of claim 1, wherein the personalization information comprises application settings.

10. The method of claim 1, further comprising:
receiving, from the first access provider, a third message for a second service provider, the third message associated with the first identifier;
disassociating the first identifier from the third message;
associating the third message with the second identifier;
sending the third message associated with the second identifier to the second service provider; and
sending a second subset of the personalization information to the second service provider.

11. The method of claim 1, further comprising:
receiving, from the first access provider a third message for a second service provider, the third message associated with the first identifier;
disassociating the first identifier from the third message;
obtaining a fourth identifier;
associating the third message with the fourth identifier;
sending the third message associated with the fourth identifier to the second service provider; and
sending a second subset of the personalization information to the second service provider.

12. The method of claim 1, further comprising:
receiving personalization information;
associating the personalization information with the second identifier; and
storing the personalization information associated with the second identifier.

13. The method of claim 12, wherein receiving personalization information comprises receiving personalization information from the user.

14. The method of claim 12, wherein receiving personalization information comprises receiving a cookie from the first service provider.

15. The method of claim 12, wherein receiving personalization information comprises receiving one or more of user device characteristics, user device capabilities, user device settings, and user device addresses.

16. The method of claim 12, wherein receiving personalization information comprises receiving at least one user preference.

17. The method of claim 1, further comprising:
associating a session to the second identifier;
associating the first or second message to the session;
evaluating the message for session management information, the session management information including data representing a state of the interaction between the user and the service provider;
receiving one or more additional messages, from the access provider, for the first or second service provider, the one or more additional messages associated with the first identifier;
for each of the additional messages for the first or second service provider, received from the first access provider associating the additional messages to the session, and evaluating each of the additional messages for session management information; and
storing the session management information.

18. The method of claim 17, further comprising:
receiving, from a third access provider, a third message for the first or second service provider, the third message associated with a fourth identifier for the user;
determining the fourth identifier is mapped to the first identifier;
disassociating the fourth identifier from the third message;
associating the third message with the second identifier; and
sending the third message associated with the second identifier to the first or second service provider.

19. The method of claim 18, further comprising:
determining the third identifier is associated with the session;
retrieving the session management information associated with the session; and
sending the session management information to the first or second service provider.

20. The method of claim 1, further comprising:
receiving, from a third access provider, a third message for the first or second service provider, the third message associated with a fourth identifier for a user;
determining the fourth identifier is mapped to the first identifier;
disassociating the fourth identifier from the third message;
associating the third message with the second identifier; and
sending the third message associated with the second identifier to the first or second service provider.

21. The method of claim 20, wherein receiving the first message for the first service provider comprises receiving the first message at a first identity provider, and wherein receiving the second message for the second service comprises receiving the second message at a second identity provider, and wherein determining the third identifier is mapped to the first identifier comprises accessing, from the second identity provider, a data storage including user identification mappings mapping user addresses for the first access provider to user addresses for the second access provider.

22. The method of claim 1, wherein obtaining the second identifier comprises determining the first identifier is mapped to the second identifier.

23. The method of claim 1, wherein obtaining the second identifier comprises obtaining a new identification for the user.

24. The method of claim 1, further comprising:
authenticating the second identifier; and
wherein sending the first message comprises sending the first message with an indication the second identifier has been authenticated.

25. The method of claim 1, wherein receiving the first message comprises receiving the first message from a mobile network operator (MNO).

26. The method of claim 25, wherein first identifier is an MSISDN.

27. The method of claim 1, wherein receiving the first message from the first access provider comprises receiving the first message from a wireless network provider.

28. The method of claim 27, wherein the wireless network provider is one of a provider of General Packet Radio Service (GPRS), WiFi, 2.5G, FOMA, UMTS, CDMA, and EDGE.

29. The method of claim 1, wherein the first service provider is a payment provider, the method further comprising:
receiving a request to authorize a payment amount, the request associated with the second identifier;
providing the authorization to the payment provider.

30. The method of claim 29, further comprising transmitting the payment amount to the first access provider.

31. A system comprising:
a processor; and
a memory coupled with and readable by the processor and having stored therein a sequence of instructions which, when executed by the processor, cause the processor to manage personalization and identity information by:

receiving, from a first access provider, a first message for a first service provider, the first access provider providing access to a communication network to a device of a user, the first service provider providing one or more services to the user of the communication network, and the first message associated with a first identifier corresponding to a user of the first access provider, the first identifier identifying the user allowing the user to access and communicate with the first access provider; and in response to receiving the first message from the first access provider:

obtaining a second identifier on behalf of the user;

disassociating the first identifier from the first message;

associating the first message with the second identifier; and sending f the first message associated with the second identifier to the first service provider, the second identifier providing for communication with the first service provider while masking identity information for the user and the device of the user contained within the first identifier;

retrieving personalization information associated with the second identifier, wherein the personalization information comprises one or more of user preferences, user device characteristics, user device capabilities, user device settings, and user device addresses;

sending a first subset of the personalization information to the first service provider;

receiving, from a second access provider, a second message for the first service provider, the second message associated with a third identifier of the user of the second access provider; and in response to the second message from the second access provider:

determining the third identifier is mapped to the first identifier;

disassociating the third identifier from the second message;

associating the second message with the second identifier;

sending the second message associated with the second identifier to the first service provider; and sending the first subset of the personalization information to the first service provider.

32. A non-transitory computer-readable memory having stored thereon a sequence of instructions which, when executed by a processor, cause the processor to manage personalization and identity information by:

receiving, from a first access provider, a first message for a first service provider, the first access provider providing access to a communication network to a device of a user, the first service provider providing one or more services to the user of the communication network, and the first message associated with a first identifier corresponding to a user of the first access provider, the first identifier identifying the user allowing the user to access and communicate with the first access provider;

and in response to receiving the first message from the first access provider:

obtaining a second identifier on behalf of the user;

disassociating the first identifier from the first message;

associating the first message with the second identifier;

and sending the first message associated with the second identifier to the first service provider, the second identifier providing for communication with the first service provider while masking identity information for the user and the device of the user contained within the first identifier;

retrieving personalization information associated with the second identifier, wherein the personalization information comprises one or more of user preferences, user device characteristics, user device capabilities, user device settings, and user device addresses;

sending a first subset of the personalization information to the first service provider;

receiving, from a second access provider, a second message for the first service provider, the second message associated with a third identifier of the user of the second access provider;

and in response to the second message from the second access provider:

determining the third identifier is mapped to the first identifier;

disassociating the third identifier from the second message;

associating the second message with the second identifier;

sending the second message associated with the second identifier to the first service provider;

and sending the first subset of the personalization information to the first service provider.

* * * * *

UNITED STATES PATENT AND TRADEMARK OFFICE
CERTIFICATE OF CORRECTION

| | | |
|---|---|---|
| PATENT NO. | : 8,051,472 B2 | Page 1 of 1 |
| APPLICATION NO. | : 10/890786 | |
| DATED | : November 1, 2011 | |
| INVENTOR(S) | : Maes | |

It is certified that error appears in the above-identified patent and that said Letters Patent is hereby corrected as shown below:

IN THE DRAWINGS:

On Sheet 5 of 6, in figure 7, Reference Numeral 702, line 3, delete "Identifer" and insert -- Identifier --, therefor.

IN THE SPECIFICATIONS:

In column 5, line 38, delete "28." and insert -- 28, --, therefor.

In column 6, line 27, delete "network /access" and insert -- network/access --, therefor.

In column 10, line 20-21, delete "635 ," and insert -- 635, --, therefor.

In column 10, line 22, after "like" insert -- . --.

IN THE CLAIMS:

In column 15, line 18, in Claim 31, delete "f the" and insert -- the --, therefor.

Signed and Sealed this
Seventh Day of February, 2012

David J. Kappos
*Director of the United States Patent and Trademark Office*